US012668713B2

(12) United States Patent
Op De Beeck et al.

(10) Patent No.: US 12,668,713 B2
(45) Date of Patent: Jun. 30, 2026

(54) PRINTING PRIMER COMPOSITION FOR ADJUSTING A SUBSTRATE

(71) Applicant: XEIKON MANUFACTURING N.V., Lier (BE)

(72) Inventors: Werner Jozef Johan Op De Beeck, Putte (BE); Lode Erik Dries Deprez, Lier (BE); Wouter Jeroom Maria Van Gaens, Duffel (BE); Sylwia Szwedo-Furmańska, Wilrijk (BE); Frank De Voeght, Heist-Op-Den-Berg (BE); Yolanda Justo Zarraquiños, Wilrijk (BE)

(73) Assignee: XEIKON MANUFACTURING N.V., Lier (BE)

( * ) Notice: Subject to any disclaimer, the term of this patent is extended or adjusted under 35 U.S.C. 154(b) by 48 days.

(21) Appl. No.: 18/728,556

(22) PCT Filed: Jan. 16, 2023

(86) PCT No.: PCT/EP2023/050870
§ 371 (c)(1),
(2) Date: Jul. 12, 2024

(87) PCT Pub. No.: WO2023/135297
PCT Pub. Date: Jul. 20, 2023

(65) Prior Publication Data
US 2025/0084272 A1 Mar. 13, 2025

(30) Foreign Application Priority Data
Jan. 14, 2022 (NL) ..................................... 2030551

(51) Int. Cl.
| | |
|---|---|
| *C09D 11/54* | (2014.01) |
| *C09D 11/023* | (2014.01) |
| *C09D 11/102* | (2014.01) |
| *C09D 11/104* | (2014.01) |
| *C09D 11/106* | (2014.01) |
| *C09D 11/107* | (2014.01) |
| *C09D 11/30* | (2014.01) |

(52) U.S. Cl.
CPC ........... *C09D 11/54* (2013.01); *C09D 11/023* (2013.01); *C09D 11/102* (2013.01); *C09D 11/104* (2013.01); *C09D 11/106* (2013.01); *C09D 11/107* (2013.01); *C09D 11/30* (2013.01)

(58) Field of Classification Search
CPC ...................................................... C09D 11/54
See application file for complete search history.

(56) References Cited

U.S. PATENT DOCUMENTS

| | | | |
|---|---|---|---|
| 2006/0134380 A1 * | 6/2006 | Sisler ................. | G03G 15/1695 |
| | | | 428/141 |
| 2015/0273885 A1 | 10/2015 | Imai | |
| 2018/0099519 A1 | 4/2018 | Forget | |
| 2018/0163086 A1 | 6/2018 | Crombie | |

OTHER PUBLICATIONS

Janczuk et al. "Surface Free-Energy Components of Liquids and Low Energy Solids and Contact Angles" (1987).*
Biolin Scientific Technology Note.*
International Search Report and Written Opinion for International Application No. PCT/EP2023/050870, mailed on May 8, 2023, 14 pages.

* cited by examiner

*Primary Examiner* — Austin Murata
(74) *Attorney, Agent, or Firm* — KDW Firm PLLC

(57) ABSTRACT
A primer composition to improve ink acceptability of polymeric surfaces. The primer composition includes a first polymeric binder component A having a first polar contribution pc1 less than 20%; and a second component B comprising an inorganic particle B' and/or a second polymeric binder component B". The polymeric binder component B" has a second polar contribution pc2 equal or higher than 20%. The amounts of A, B' and/or B", based on the dry weight of the composition, are as such that when present B'/(A+B"+B') is smaller than 15%. The first polar contribution pc1 and second polar contribution pc2 are determined by using the Owens-Wendt-Rabel-Kaelble method with a 6 gsm dry layer of components A and B respectively.

22 Claims, No Drawings

PRINTING PRIMER COMPOSITION FOR ADJUSTING A SUBSTRATE

This application is a national stage filing under 35 U.S.C. 371 of pending International Application No. PCT/EP2023/ 050870, filed Jan. 16, 2023, which claims priority to Netherlands patent application 2030551, filed Jan. 14, 2022, the entirety of which applications are incorporated by reference herein.

The present invention relates to the technical field of digital printing with water based inks on paper, or polymeric film substrates. Note that the paper or polymeric film substrates may be part of a corrugated board, a label, a laminate, etc. More in particular, the invention relates to the use of a printing primer composition to improve the ink receptibility of the substrate in order to improve printing quality.

Substrates, like paper or polymeric films are already used in the printing industry. However, many of the paper substrates are given specific properties such as water resistance or water repellency, ink holdout, smoothness, gloss etc. Unfortunately this often makes it more challenging to ensure that waterbased inks spread out sufficiently thereby achieving a good print quality in industrial single pass printing. Similarly, insufficient ink wetting is often observed when printing with waterbased inks on plain untreated polymeric films.

Ink wetting is typically called 'dotgain' in inkjet printing. The lack of sufficient dotgain creates white voids between the dots (or stripes in single pass printing) and as a consequence a lower color strength. The latter is also called optical density.

In terms of paper substrates most problematic to achieve a good print quality with waterbased inkjet inks are coated paper substrates because the absorption of the ink droplets by the coated paper substrates is very limited. Absorption of ink into the paper normally is one of the main driving factors for ink spreading. Obviously, for plain polymeric films there is even no absorption at all.

The lack of ink absorption for coated paper and polymeric films also may lead to other image defects. Indeed, when the ink is not dried very quickly the wet ink layer is sensitive towards the formation of "mottle" or "inter-color bleeding".

One way to address the complexities regarding coated substrates is to adapt the ink based on the type of coating. However, one inkjet ink formula might perform well on one substrate but not on a second one. Hence, considerable adjustments in ink composition might be required to achieve the same image quality on multiple substrate types. However, changing inks in an industrial digital press is very time consuming and drastically reduces the advantages of digital over analogue printing. On top of that, ink formula fine tuning is far from trivial with respect to maintaining optimal jetting behavior (surface tension, viscosity, particle size) and excellent storage stability.

Another way used in industrial printing is to make use of a primer in order to enhance image properties such as color strength (optical density), adhesion, image sharpness etc. for inks on these different kind of substrates.

A first known primer type (U.S. Pat. No. 8,562,126B1) contains 'flocculants' or 'aggregating agents' such as polyvalent metal salts, acidic compounds or cationic polymers in combination with a polymeric binders such as acrylates or polyurethanes. However, such a "flocculant primer" has the disadvantage that when the ink comes in contact with the flocculants the liquid viscosity will increase drastically, thereby reducing the dotgain of the landing ink droplet as ink spreading occurs much more easily when the ink viscosity is still low. This is even more the case when using these kind of primers on coated paper or film substrates with limited or no porosity and only surface tension effects acting as the driving force for ink spreading.

Another disadvantage of such "flocculant primers" is related to what the inventors call "misting", ie. during primer lay down microscopic mist particles may form during primer lay down. This problem may occur with analogue flood coating stations but is even more relevant when the primer itself is applied with inkjet printing. Indeed, when the primer is not applied beforehand or in a separated priming unit but applied inline said mist particles may reach the nozzle plate of the other inkjet printing stations and due to the presence of flocculants such as multivalent metal salt, cationic polymers or organic acids, cause irreversible nozzle blocking due to crashing out the anionically stabilized ink components such as pigments or binders.

A final disadvantage of having flocculants in the primer is that anionic binders cannot be used since the dispersion stability or solubility of the binders will be destroyed. Thus primers with flocculants and the like can only be combined with cationic or non-ionic polymer binders. Due to the fact that most commercially available binders are anionically stabilized/solubilized, the selection of suitable primers becomes very limited.

A second known primer type (EP2332734B1) is a porous ink receptive coating composition that contains monodispersive and spherical cationic colloidal silica particles having an average particle size from 30 nm to 60 nm.

The disadvantage of this technique is the complex laydown and cost of such a primer coating. To have a functional amount of void space to absorb the ink liquid, the coating layer must be minimally 4 gsm dry coat weight which typically means a wet coating film of 10-20 gsm and the latter would demand a very high drying capacity to be fully dried. As a consequence it is nearly impossible to do this inline for a high speed single pass printing processes. Additionally, another disadvantage for porous ink receptive coatings is that it is very difficult to find a balance between binder content and pigment concentration to achieve the high capillarity but still sufficient adhesion to the substrate and avoid dusting effects.

Finally, coatings with porous structure typically lower the glossiness of the paper. Hence for a glossy appearance a thin second top layer must be applied consisting of colloidal inorganic particles bound by resin, thereby further increasing the complexity and cost.

SUMMARY

Therefore, it is an object of the invention to provide a technique to improve ink receptibility of such coated substrates in order to achieve decent print quality with sufficient dotgain without inter-color bleeding and avoiding one or more of the disadvantages as mentioned above.

Hence, a first aspect of the invention provides a primer composition for forming a primer layer PL, on a substrate to be printed on with an ink I, in particular a pigmented inkjet ink for digital printing. The composition comprises the components as claimed. Namely, —a first polymeric binder component A having a first polar contribution pc1 less than 20%; —a second component B comprising an optional inorganic particle B' and a second polymeric binder component B"; wherein said polymeric binder component B" has a second polar contribution pc2 equal or higher than 20%; wherein the amounts of A, B' and/or B", based on the dry weight of the composition, are as such that when present $B'/(A+B''+B')$ is smaller than 15%.

The first polar contribution pc1 and second polar contribution pc2 are determined by using the Owens-Wendt-Rabel-Kaelble method with a 6 gsm dry layer of components A and B respectively. This excessively thick polymer layer of 6 gsm is used to exclude any remaining influence of the material underneath the polymer film. The polar contribution is the contribution of the polar component to the total surface energy.

It was surprisingly found that when printing with aqueous digital printing inks on low absorbing media such as coated paper and polymeric film several image quality improvements can be achieved by applying a layer with the above-mentioned primer composition. Even with a relative thin thickness such as a thickness smaller than 10 gsm wet weight thickness and in preferred cases even smaller than 3 gsm wet weight. Several tests have shown promising results for the primer layers on different types of substrates which include the primer composition according to the invention.

Said results show an increase in color density, increase in dotgain (thus improving optical density), and a reduction of banding and inter color bleeding or mottle. Furthermore, there is also no loss in gloss due to a porous structure.

In addition, it has been found that such desired primer qualities can be achieved without the need of flocculants and the like, thereby avoiding the risk of irreversible nozzle blocking. On top of that, the primer composition of the invention is compatible with both anionic binders and cationic or non-ionic polymer binders, thereby broadening the choice of commercially available binders. An advantage of the primer composition of the invention is that one may lay down a primer layer with less than 4 gsm dry coat weight (ie. a wet coating film of less than 10 gsm) on a substrate. As such, one can improve the drying times and/or reduce the need of a high drying capacity over prior art primer techniques.

Indeed, improved image quality can also be achieved at relative small thicknesses. The pre-treatment liquid layer thickness is preferably between 0.5 gsm and 10 gsm, more preferably between 0.5 and 9 gsm, even more preferably between 0.5 and 8 gsm and the amount of solids is preferably between 1 gsm and 5 gsm.

It has been found that when using the primer composition and working within these ranges of thickness, the primer composition can be applied inline at high speeds and without the need of high-capacity drying stations which require a lot of operating energy. The amount of solids that remain on the substrate after drying of the pre-treatment liquid layer is then 3 gsm or below. For a wet weight primer thickness below 8 gsm, it is possibly to apply the primer inline with a single pass high speed printing process above 30 m/min, or even above 90 m/min. Indeed, such a small wet weight thickness with limited amount of water makes that the primer layer can be dried before the substrate arrives at a first color printing station. If the primer is not dry one may impose risk of intercolor bleeding. As such, it is preferred that the primer is substantially dry before the first color ink is printed.

Indeed, it has been found that by having the first polymeric binder component A having a polar contribution below 20% in combination with either one of or both of the inorganic particle B' and the second polymeric binder having a polar contribution of a higher than 20%, more preferably more than 22%, more preferably more than 24%. It has been found that by having component B' and/or B'' one may improve dotgain and achieve a desired optical density while there is still sufficient spreading of aqueous ink jet droplets.

It is preferred that the dry weight ratio of A/(B' and/or B'') is between 0.05 and 20, more preferably between 0.15 and 6. In this way, one sets a proper balance between ink receptibility, wettability and dotgain such that the ink can be applied on several different types of substrates without image defects and without having to fine tune and/or change the inkjet ink when said substrates are pretreated with a primer layer comprising the primer composition as described herein.

It is further preferred that the combined solid content of component A, optional inorganic particle B' and component B'' are at least 12%, more preferably at least 14%, even more preferably at least 15% of the wet weight of the primer composition. By increasing the solid content of the primer composition, the composition will dry quicker. The drying speed is also dependent on the layer thickness. A thin layer will dry quickly, and technically a lower solid content can be utilized. However, a thin layer with a low solid content will not result in a useful primer coating, since almost no primer is then present on the substrate.

It is further preferred that components A and B are both anionic or non-ionic. By having such binders, one is not limited to cationic or non-ionic polymer binders. As, such one can work with most commercially available binders which are anionically stabilized/solubilized without destroying the dispersion stability or solubility.

As mentioned before, it is preferred that the composition is essentially free of flocculants agents. More preferably less than less than 0.05 wt % of such flocculants based on the total weight of the primer composition. Said flocculant agents including but not limited to multivalent metal salts, calcium chloride, cationic polyelectrolytes, polydiallyldimethylammonium chloride and/or (in) organic acids, acetic acid. In this way, one avoids that anionic binders cannot be used since then the dispersion stability or solubility of the binders may be destroyed.

A flocculant is a compound or agent which is added to make particles aggregate together and form larger particle aggregates, such agents are often used in prior art primer compositions to achieve certain benefits. However, it has now surprisingly been found that such benefits and decent image quality can still be achieved with the primer composition as described herein without the need of flocculants. As a result the risk of "misting" and irreversible nozzle blocking can be avoided. Examples of flocculants causing nozzle blocking are multivalent metal salts, for example calcium chloride, cationic polyelectrolytes, for example polydiallyldimethylammonium chloride and/or (in) organic acids, for example acetic acid. When flocculants are present, they should be kept below 0.5 wt %, preferably below 0.2 wt %, more preferably below 0.05 wt %, most preferably below 0.02 wt % based on the total weight of the composition of the primer.

It is preferred that component A has an MFFT value of less 80° C., preferably than 40° C., more preferably less than 35° C., wherein MFFT stands for minimum film forming temperature. By including component A having a low MFFT value into the composition, one ensures that a printed primer layer formed with the primer composition will nicely film form when applied inline in a printing process such that the substrate is sufficiently covered with an even layer of primer layer. As mentioned before, it is a benefit of the present primer composition that it can be applied inline with a single pass high speed printing process above 30 m/min, or even above 90 m/min.

Preferably, the average particle size of the inorganic particle is more than 0.3 µm, preferably more than 1 µm, preferably between 1 μm and 20 μm as measured acc. to ISO 13320:2020. In particular in the case of a primer composition having the polymeric binder component A and the inorganic particle component B', without the polymer binder component B" having the apolar contribution higher than 20%, it has the preference that the average particle size of the inorganic particle component is more than 0.3 μm, preferably more than 1 μm. By having a sufficiently large particle, one reduces the risk of loss of the functionality of the inorganic particle. Namely, a smaller size of inorganic particle may result in a deep penetration of the particles within the primer composition and/or within the pores of the substrate such that the functionality of particle at the surface of the primer layer is reduced. Hence, it is preferred that the average particle size is sufficiently large in order to achieve the benefit that the inorganic particles within the primer composition will give their desired functionality at the surface of the primer layer, said desired functionality includes slight matting and rub resistance properties. In preferred embodiments, the average particle size of the inorganic particle B' is larger than 50% of the thickness of the dry primer layer. Furthermore, small nanosized particles such as silica are difficult to obtain and are typically more expensive. In more preferred embodiments, the average particle size of the inorganic particle B' is larger than the thickness of the dry primer layer, e.g. the average particle size of the inorganic particle B' is 100-200% of the thickness of the dry primer layer. This improves the functionality of the particle at the surface of the dry primer layer so that the ink receptibility of the primer layer is enhanced even further. In most preferred embodiments, the average particle size thickness is 110 to 130% of the thickness of the dry primer layer. Surprisingly, a ratio of 110 to 130% of average particle size to primer layer thickness achieves an optimal balance between the effect of the organic particle on the ink and the effect of the other components in the dry primer layer on the ink thereby enhancing the overall ink receptibility of the dry primer layer.

It is further preferred that component B" has a polar part of the surface free energy of component B" of 9 mN/m or more, as measured with a Dataphysics OCA25 apparatus and determined with the Owens-Wendt-Rabel-Kaelble (OWRK) method for a 6 gsm dry polymer layer. By having component B" in the composition having such a relative high polar part of 9 mN/m or more, one ensures decent wettability of water based inks such that one may improve dot gain and achieve a decent optical density.

A second aspect of the invention provides a primer kit, to adjust a surface of a substrate with a printing primer (P3). The primer kit comprises a first primer P1 with a first polymeric component A1 and a second component B1.

The first polymeric component having a polar contribution of less than 20%. The second component B1 comprises an inorganic particle B1' and/or a second polymeric binder component B1"; in particular the second component B1 comprises an optional inorganic particle B1' and a second polymeric binder component B1". Said polymeric binder component B1" has a second polar contribution pc2 equal or higher than 20%.

The primer kit further comprises a second primer P2 with a third polymeric component A2 and/or a fourth component B2.

The third polymeric component A2 having a polar contribution of less than 20%.

The fourth component B2 being selected from one or more of: an inorganic particle B2', a fourth polymeric binder component B2" having a polar contribution equal or higher than 20%.

The A1+B1 composition in the first primer P1 is different than the A2+B2 composition in the second primer P2. In this way the wt %-ratio of (A1 and A2)/(B1 and B2) in the printing primer P3 can be adjusted by mixing a first amount of first primer and a second amount of second primer in order to adjust the surface of the substrate as desired by applying the printing primer P3 thus obtained thereon.

The polar contributions are determined using the Owens-Wendt-Rabel-Kaelble method with a 6 gsm dry layer of the polymeric binder component referred to. In particular, the polar contribution to the surface tension is the ratio of the polar part of the surface energy over the total surface free energy. The surface energy values are determined using 3 reference liquids and for each measuring the contact angles of a droplet on the substrate. The substrate may be covered with a 6 gsm dry layer of the primer component according to the invention. Furthermore, the total surface energy, polar and dispersive components are obtained using the Owens-Wendt-Rabel-Kaelble calculation method.

The aspect is based on the insight that different types of coated substrates that differ in wettability and/or types of inks may require a different primer approach. By having the primer kit with said first primer P1 and second primer P2, one may adapt the third printing primer P3 accordingly in order to obtain decent image quality. Such primer kit is beneficial as it facilitates ease of adaptation to and working with different types of (coated) substrates that differ in wettability. By having the primer kit at one's disposal one can readily adapt to such substrate and thereby achieve a good image quality.

Components having a low polar contribution, namely lower than 20%, are also described herein as "low or medium wetting".

When referring to the A1+B1 composition (or A2+B2 composition), it is to be understood that reference is made to the types of component and/or the wt %-amount of the components in the first primer P1 (or second primer P2). For example, component B1 in the first primer may be of a different type than component B2 in the second primer and/or component B1 in the first primer may be the same as B2 in the second primer but may be present in a different wt %-amount based on the total weight of the first primer in comparison with the wt %-amount of B2 based on the total weight of the second primer. The first polymeric component A1 and the third polymeric component A2 can be different or the same. The second polymeric component B1 and the fourth polymeric component B2 can be different or the same. Either the first polymeric component A1 is different from the third polymeric component A2, or the second polymeric component B1 is different from the fourth polymeric component B2.

By having the A1+B1 composition of the first primer P1 being different than the A2+B2 composition of the second primer P2. The ratio in printing primer P3 to be applied between component A having a polar contribution of less than 20% and the other component B, either the inorganic particle and/or a polymeric component, can easily be varied to provide optimal image during high-speed single pass printing on a wide range of coated paper liners or even polymeric film substrates such as labels and flex pack.

When for example working with highly hydrophobic substrates on which inkjet droplets exhibit high contact angles, one will require a printing primer P3 having a higher amount of component B", whereas when the inkjet droplet exhibits a low contact angles the substrate will require a primer with lower amounts of component B".

As such, there is provided a third aspect of the invention which provides a method to obtain a printing primer P3 for adjusting ink receptibility of a substrate by applying said printing primer P3 thereon. Said method comprising: —providing a first primer P1 comprising: a first polymeric component A1 having a polar contribution of less than 20%; and/or a second component B1 comprising: an inorganic particle B1' and/or a second polymeric binder component B1"; wherein said polymeric binder component B1" has a second polar contribution pc2 equal or higher than 20%. —providing a second primer P2 comprising: a third polymeric component A2 having a polar contribution pc3 of less than 20%; and/or a fourth component B2 comprising: an inorganic particle B2' and/or a fourth polymeric binder component B2"; wherein said polymeric binder component B2" has a second polar contribution pc4 equal or higher than 20%; with the proviso that at least one of the primers P1, P2 includes a polymeric component having a polar contribution of less than 20% and that the other one of the primers P1, P2 includes a component selected from one or more of: an inorganic particle, and a polymeric component having a polar contribution of equal or higher than 20%. In an embodiment the proviso in the aforementioned method is such that at least one of the primers P1, P2 includes a polymeric component having a polar contribution of less than 20% and that at least one the primers P1, P2 includes a polymeric component having a polar contribution equal or higher than 20%; in particular in that one of the other one of the primers P1, P2 includes a component having a polar contribution of equal or higher than 20%, and in that the further component are selected from one or more of: an inorganic particle, and a polymeric component having a polar contribution of equal or higher than 20%. Amounts of A and B within the at least one of the primers P1, P2 are typically different than amounts of A and B within the other one of the primers P1, P2. In this way, the presence of both component A, also referred to as "a low polar contribution component" or a "low or medium wetting component", and component B in the printing primer is ensured. Preferably, the proviso in the aforementioned method is that at least one of the primers P1,P2 includes a polymeric component A having a polar contribution of less than 20% and that the other one of the primers P1, P2 includes a component B" being a polymeric component having a polar contribution of equal or higher more than 20% and optionally an inorganic particle. In this way, one can improve color density, dotgain, and causes reduction of banding and inter color bleeding or mottle issues. Furthermore, there is also no loss in gloss due to a porous structure which is unavoidable for many known primer types. The method further comprises mixing a first amount p1 of the first primer P1 and a second amount p2 of the second primer P2 to form the printing primer P3; and applying the printing primer P3 on a surface of the substrate. The method further comprises testing the ink receptibility by printing a test image, for example a test pattern (including features to asses linewidth, dotsize, intercolorbleeding, etc.), and if required adjust the first amount p1 and/or the second amount p2 to set wt %-ratio of (A1 and A2)/(B1 and B2) in the printing primer P3 based on a characteristic of the printed test image. By following said procedure, a printing primer is obtained with an improved ink receptibility and image quality when said printing primer P3 is printed on. By repeating this procedure for different substrates one can readily make effective primer solutions for a wide range of substrates using the minimal amount of different start materials.

A further aspect of the invention provides a method of printing with an ink on a substrate, such as a paper coated with a polymeric film. The method has the steps of: providing the substrate; creating a primer layer PL on the substrate by applying the primer composition as described herein or by applying the printing primer P3 as described herein. Applying the ink on the substantially dry primer layer. A person of ordinary skill understands that "substantially dry" refers to the condition of the primer layer which is dry enough to receive ink without image defect.

The primer layer may be created with in an analog printing process, digital printing process, such as a digital flexographic printing process, by applying the primer composition or the printing primer P3 accordingly.

In certain embodiments, the primer composition or the primer P3 is applied with a piezo inkjet nozzle. In this way, one achieves the inking properties of the inkjet nozzle without having the issue of nozzle blocking.

Preferably, the primer composition or printing primer P3 is applied in a functional amount of less than 16 gsm wet weight thickness, more preferably less than 12 gsm, even more preferably less than 10 gsm wet weight thickness, most preferably less than 8 gsm wet weight thickness. By having the primer composition or printing primer P3 as described herein, decent primer capabilities are achieved even at relative low wet weight thicknesses, such a low wet weight thickness, has the benefit that one may reduce the demand of a high drying capacity. In this way, the operating cost of a printing process may be reduced. Preferably, the substrate is provided at a single pass speed of more than 20 m/min.

Even more preferably, the primer composition or printing primer P3 is applied such that the wet weight thickness thereof is between 0.5 gsm and 8 gsm. It has been found that the primer composition or printing primer P3 as described herein allows such small thicknesses without set back in primer capabilities, such as ink receptibility. The term "ink receptibility" is to be understood herein as the ability and willingness to receive ink such that an ink image can be formed without image defects. Is has been found that when wet weight thickness are between 0.5 gsm and 8 gsm, the substrate can provided at relative high printing speeds, namely a single inline pass speed of more than 30 m/min, even more than 45 m/min, and preferably even more than 90 m/min. In this way, the primer composition or printing primer P3 can be applied inline on said substrate at high speed and without a reducing ink receptibility. In this way, one can print higher volumes of substrates per unit of time which is beneficial. A particular aspect relates to a set of the primer kit as described herein to obtain a printing primer P3 for adjusting ink receptibility of a substrate by applying said printing primer P3 thereon and wherein said set further comprises one or more inkjet inks.

DETAILED DESCRIPTION

The terms "flocculant" and the like, as used herein, means any material that can cause colloidal particles, such as pigment particles or lattices, to sediment or clump together.

Inks

Inks to apply on the primer layer are known. It is preferred that the inks are waterbased or aqueous inks.

Aqueous inks can be broadly classified into pigment dispersion inks and dye inks. In recent years, demand has been growing for pigment dispersion inks, which exhibit excellent color development and solvent, gas and (UV-)light resistance and the like. On the other hand, in the case of pigment aqueous dispersion inks, because the pigment is insoluble in water, in many cases, satisfactory pigment dispersibility cannot be achieved. Accordingly, in order to maintain favorable pigment dispersibility within aqueous inks, pigment dispersing resins have been used to achieve better dispersion stability of the pigment in water. These pigments are also considered better performing towards migration into food. The use of a colorant in inks as described above is the most essential form of a water-based ink. Aqueous inks used in inkjet printing methods often also contain a water-soluble solvent having a high boiling point and favorable solubility in water in order to prevent drying of the ink at the nozzles, aqueous inks used in typically. This type of solvent is regarded as a humectant in the aqueous ink. Furthermore, to enable a minimal amount of wetting and spreading of water-based inks in the printhead, on the substrate, etc. the aqueous inks used in ink-jet printing methods typically also contain one or more surfactants. Finally, the aqueous ink composition may also contain various types of additives such as anti-foaming agents, thickeners, binders and preservatives as required. Adding these types of additives to the aqueous ink composition enables the composition to be used more favorably as an inkjet ink.

It is preferred that the ink jet inks are optimized for maintaining optimal jetting behavior (surface tension, viscosity, particle size) and excellent storage stability.

Substrates

Substrates based on paper or polymeric films are known and can be suitably selected in accordance to the main end use (retail, foods, beverages, consumer electronics, etc.). An example structure of such a substrate is a bleached or unbleached chemical pulp coated with one or more coatings. Preferred substrates are also described as a "(kraft) liner". Preferably the substrate, comprises a polymeric film and/or a paper, for example as used in solid board, graphic art paper, liners used for corrugated cardboard, labels, laminates, food packaging, and/or flexible packaging; preferably, the substrate comprises a coated paper. Coated paper substrates are generally known to have poor receptivity to aqueous ink-jet inks due to low surface porosity as a result of calendaring and/or application, paper sizing and one or more layers of hydrophobic coating layers. The resultant low porosity and hydrophobicity means less channels for the ink vehicle to access which may results in slow ink drying and therefore also image defects such as inter-color bleeding. Furthermore, a hydrophobic nature of the paper coating causes reduced wetting out and spreading out of aqueous inks upon printing which can then lead to puddling of ink drops on the media surface. The combined effect of less dot spread and slower drying leads to many more image defects when printing aqueous inks directly on coated substrates.

When printing with aqueous inks on polymeric film substrates such as flexible packaging or self-adhesive labels the same problems arise since these materials are hydrophobic and completely non porous by nature. Typical polymeric film materials include PE, PP, PET and biodegradable materials comprising PLA, cellulose (cellophane) or other plant-derived materials. The films are however not limited to these types. Preferably, the substrate is a polymeric film or a coated paper substrate, preferably said substrate being chosen from a liner used for one or more of: corrugated cardboard, labels, laminates, food packaging, flexible packaging, solid board, graphic art paper.

The Polymeric Binders A and B"

The primer composition further includes a first polymeric binder component A having a first polar contribution pc1 less than 20% and in some embodiments a second polymeric binder B" component having a second polar contribution pc2 equal or higher than 20%. The polar contribution is the polar component divided by the total of the dispersive component and the polar component. Said factors are present in the surface free energy of a solid (e.g dry primer film) as said surface free energy contains the dispersive component and the polar component.

The first polymeric binder component A having a first polar contribution pc1 less than 20% can be selected by the skilled person using the Owens-Wendt-Rabel-Kaelble method to determine polar contribution. This method can be carried out in the following way:

applying a 6 gsm dry layer of components A or B", respectively;

applying a 1 μL droplet of ethylene glycol on the dry layer and measuring the contact angle A1 after 10 seconds equilibrium time;

applying a 1 μL droplet of diiodomethane on the dry layer and measuring the contact angle A2 after 10 seconds equilibrium time;

applying a 1 μL droplet of thiodiglycol on the dry layer and measuring the contact angle A3 after 10 seconds equilibrium time;

calculating the polar surface free energy, dispersive surface free energy and total surface free energy, wherein the total surface free energy is the sum of the polar surface free energy and the dispersive surface free energy, wherein the calculation is performed using the Owens-Wendt-Rabel-Kaelble method using A1, A2 and A3 as input values; and wherein the first polar contribution pc1 and second polar contribution pc2 are the ratio of the polar surface free energy over the total surface free energy value as determined for components A respectively B", expressed as a percentage.

The methodology as used herein to determine the polar contribution pc1 includes applying 1 μl droplets of EthyleneGlycol, Diiodomethane, Thiodiglycol (these are liquids with known total, polar and dispersive surface tension) on a 6 gsm dry layer of said first component A (or a 6 gsm dry layer of second component B" in case of determining the polar contribution pc2 of the second component B") formed on the substrate and wherein the contact angle of the droplets after 10 seconds equilibrium time is measured. The three contact angles measured for each of the reference solvents ethylene glycol, diiodomethane and thiodiglycol on the dry layer are used as input values for the Owens-Wendt-Rabel-Kaelble calculation method (OWRK method). Via the OWRK method the total surface free energy, polar surface energy and dispersive surface energy is determined where the total surface free energy is the sum of the polar surface free energy and the dispersive free energy. Hence, the polar contribution pc1 (or said second polar contribution pc2) is the ratio of the polar surface free energy over the total free energy value, expressed as a percentage. The carrier is mostly water, the binder may also comprise small quantities of organic solvent and additives.

Such calculations are often already preprogrammed in commercial contact angle goniometers, such as by a Dataphysics OCA25. It is noted that instead of ethylene glycol, diiodomethane and thiodiglycol other reference solvents can be used, as long as the total, polar and dispersive surface tension of said reference solvents is known. Said method is for example described in Owens et. al., J. Appl. Polym. Sci. 13. (1969), 1741; Kaelble, J. Adhesion 2 (1970) 66. The terms "surface energy" and "surface free energy" are used interchangeably.

The polymer chemistry of said binders is not particularly limited, it can be for example (meth)acrylate, vinyl or polyurethane based. A mixture of multiple chemistries in the primer can also be an option. Vinylacetates are particularly preferred since these binders are low in cost and are often non-ionically stabilized which make them compatible with most other ionic primer components such as coalescents, surfactants and other binder chemistries.

Polymeric binder component A and/or B" can be based on: a (meth)acrylate, an acrylic, vinyl or polyurethane polymer or copolymer, preferably a vinyl acetate polymer as long as they have the respective polar contribution.

Polymer binder component A can for example be based on: acrylic polymer, a vinyl acetate polymer, a vinyl acetate and ethylene copolymer, a polyester polymer, an acrylic styrene copolymer, a polyurethane. More in particular, said binder may be based on: an alkali soluble acrylic polymer, a vinyl acetate and ethylene copolymer, an anionic acrylic dispersion, a non-ionic polyester urethane polymer, an anionic acrylic styrene copolymer emulsion, an aqueous dispersion of a polyester polymer stabilized with sulfonic groups, an anionic polyurethane dispersion with polyester backbone, an anionically stabilized acrylic-styrene copolymer dispersion, a cationic polyurethane dispersion, a non-ionic surfactant stabilized vinyl acetate ethylene copolymer, an anionic emulsion polymer based on styrene and acrylates, a nonionic homopolymeric emulsion based on vinyl acetate.

Polymeric binder component B" can for example be based on: an acrylic copolymer, such as an alkaline soluble acrylic polymer, a vinyl acetate such as a homopolymeric vinyl acetate emulsion.

The polymer can be compatibilized with water by cationic or anionic functionalities and or non-ionic hydrophilic groups. It is preferred to use polymers for the primer which are nonionic or anionic stabilized to increase the compatibility with aqueous inkjet inks as they are usually anionic. As such, one may reduce the risk of cross contamination of primer throughout the inkjet printer. In one way, one may apply the primer inline in the printing process and formation of ink particle aggregates on the print heads or even blockage of inkjet nozzles.

The Inorganic Particle B'

Besides the aforementioned polymeric binders B", also inorganic particles B' can be used and include, but are not limited to, kaolin clay, kaolin clay, Diatomaceous earth, calcium carbonate, calcined clay, silica gel, fumed silica, colloidal silica, talc, fumed alumina, colloidal alumina, titanium dioxide, zinc oxide, zinc sulfide and barium sulfate. Particularly, the inorganic particles B' can be silica particles. The particle size can vary from the nanometer range up to several microns, in order to adjust the gloss level of the primer layer. In preferred embodiments, the average particle size of the inorganic particle is more than 0.3 µm, preferably larger than 1 µm, preferably between 1 µm and 20 µm as measured according to ISO 13320:2020. As explained above, an average particle size larger than 0.3 µm, has the benefit that the inorganic particles will not penetrate deeply within the pores of the substrates such as the paper pores. By having a sufficiently large average particle size, one improves the inorganic particle functionality at the surface of the primer layer formed. In particular, primer layers formed with the primer composition without the polymeric binder component B'. By improved the particle functionality at the surface, one can give slight matting and rub resistance properties. Furthermore, nanosized particles, such as nanosized silica is more difficult to manufacture and typically more expensive. Preferably, the inorganic particle B' is present in an amount below 10 wet-weight %, more preferably below 9 wet-weight %, even more preferably below 8 wet-weight % based on the total composition of the primer composition. The wet weight percentage, also described as wet-wt %, is expressed as the wet weight of the respective component over the total wet weight of the primer formula. Advantages of low amount of inorganic particles are a reduced risk for dust formation, a reduced loss of gloss. Additionally, a higher amount of inorganic particles can result in irreversible sedimentation of the particles.

Additives

Other possible primer components include biocides, antifoaming agents, slip additives (e.g. wax particles), corrosion inhibitors, coalescing agent solvents to reduce film forming temperature of binder emulsions and the like.

It is preferred that the primer is free of flocculants especially in the case of primer application by spray technology or digital primers applied with inkjet. These two methodologies are very sensitive for formation of microscopic mist particles that can cross contaminate the color printing stations and cause pigment aggregation which will result in nozzle blockage. Furthermore, it has been found that multivalent metals of salts that are used in prior art "flocculants" can react with carbon dioxide, $CO_2$, in the air to form salt precipitates. Such salt precipitates lead to blockage of the primer application units. Even so, misting can even occur with flexo or gravure roller application, which is one of the most commonly used methods. Hence, it is preferred that the printing primer is free of any agent used to remove suspended solids from liquids by inducing flocculation, such as flocculants. Such agents cause solids to begin to aggregate forming flakes, which may precipitate and cause nozzle blocking.

Printing Method

The print process uses a primer application step, followed by an ink-jet printing step. The primer application is preferably done inline in an analogue way using a roller, flexo plate, offset plate, curtain coating and alike but can also be done by spraying or in a digital way using ink-jet printheads, either piezo or ink-jet and perhaps even piston based ink-jet, commercially available from Valvejet. When using an analogue roller system one can using a 2 roller system with a doctoring and application roller or a triple rol system where an Anilox rol is in contact with a metering roller to assure a constant primer volume in the anilox roll which is transferred to the application roller for final transfer to the substrate. By adjusting nip pressure, speed of rollers, anilox pattern, hardness of the rollers and the like, the final laydown on the substrate can be adjusted. A specific design of a triple roll system to assure a very controlled lay down is the closed chamber design Is it very important to choose a design that allows the application of a very uniform primer layer especially when thin layer are required. This can for example be achieved more easily with anilox patterns with a higher screening and honeycomb cell structure. The ink-jet step can be carried out using any kind of printhead: thermal, piezo, continuous ink-jet. The use of Valvejet-like printheads is less likely for the image generation. In between these (at least 2) steps (primer application step, followed by a ink-jet printing step), one or more drying steps can be incorporated. The primer step, namely the step of creating a primer layer, and the ink-jet printing step can be followed by another ink-jet printing step immediately but also a new primer step and ink-jet printing step can be used. The primer application step is followed by an ink-jet printing step, with an optional drying step in between. The drying means can be of any relevant kind to the used ink-jet ink technology or primer technology. It can be heat-based (hot air, infrared, near-infra-red or combinations thereof) or actinic radiation-based and the drying intensity or capacity does not have to be the same for the primer composition and the ink-jet ink. The printed product can be dried using an additional final drying step of any kind and intensity as well. Before the priming station or after each of the primer drying units a corona or plasma treater may be optionally included. Optionally, the substrate is pre-heated prior to the primer application step in an inline or offline method. Drying the ink can be both by intercolor drying units, a final drying step after completing the color printing or a combination of both. The method and intensity of drying the primer and ink can result in different image quality or may even be intentionally employed to adjust for one or more inks the amount of ink spreading, mottle and bleeding. This is especially the case when using intercolor drying methods.

EXAMPLES

The invention will now be explained by the following examples which are not intended to limit the scope of the invention.

1. Testing Individual Substrates and Primer Components.

Individual primer components were tested by measuring the contact angle and by determining the surface free energy.

The contact angle is the angle, where a liquid-vapor interface, for example an ink droplet-air interface, meets a solid surface, for example a dried primer layer. The contact angle can quantify wettability. The surface free energy can be considered as the surface tension of a solid arising from interactions at the vapor-solid interface and can be used to predict spreading behaviour when a liquid is placed on said solid surface.

Both parameters were measured and determined using a Dataphysics OCA25 apparatus for the polymeric components.

The influence of type of substrate on the contact angle and surface energy were tested by applying a water based ink (WIC2503) on the substrates, as shown for tests 1-3.

The influence of having a primer layer formed as a dried layer of 6 gsm on the surface of the substrate where subsequentially tested, as shown in test 4-6. More in particular, a coating film having a thickness of around 6 gsm of individual primer components was applied on a substrate: Metsaboard Pro WKL, a double-coated white top kraftliner. A thick layer of 6 gsm is applied to exclude any effect of the surface energy of the paper itself. The following components where used within the coating films on the substrates, referencing its parameters MFFT, particle size and solid content according to the data sheets provided by the respective suppliers:

TABLE 1

| | Commercial Name | Description | MFFT | Particle size | Solid content |
|---|---|---|---|---|---|
| | | | Primer Components | | |
| A | Exopur 4109 | Alkali soluble, acrylic copolymer | <0° C. | 125 nm | 40% as measured by EOC method 2015. |
| B" | NeoCryl - BT-20 | Alkaline soluble acrylic copolymer emulsion exhibiting good pigment wetting | 10° C. | / | 39-41% as measured by test method GAP 0001. |
| B" | Makrovil V 108 | Homopolymeric emulsion based on vinyl acetate with surfactant stabilization and very limited ionicity. | <16° C. | / | 49-51% as measured by DIN EN ISO 3251 |
| A | Vinamul 3231 | Vinyl acetate and ethylene copolymer | <0° C. | / | 49-51% as measured by DIN EN ISO 3251 |
| A | NeoCryl - D-2204 | Anionic acrylic dispersion, that is self crosslinking. | 33° C. | 60 nm as measured by GAP test method 1176. | 39-41% as measured by test method GAP 0001. |
| A | Baybond PU 404 | Non-ionic polyester urethane polymer. | <0° C. | / | 48-52% as measured by DIN EN ISO 3251 |
| A | Neocryl XK-205 | Anionic acrylic styrene copolymer emulsion | 55° C. | / | 41%-43% according to manufacturer |
| A | Eastek 1200 | Aqueous dispersion of a polyester polymer, stabilized with sulfonic groups | 27° C. | / | 30% according to manufacturer |
| A | Daotan 7001/40 | Anionic polyurethane dispersion with polyester backbone | / | / | 38.5-41.5% according to manufacturer |
| A | Neocryl A1120 | Modified acrylic-styrene copolymer dispersion, anionically stabilized | <0° C. | / | 54-56% according to manufacturer |
| A | Esacote P1 C1 | Cationic polyurethane dispersion | 0° C. | / | 29-31% according to manufacturer |
| A | Vinamul 3171 | vinyl acetate ethylene copolymer, non-ionic surfactant stabilized | 0° C. | / | 54-56% as measured by DIN EN ISO 3251 |
| A | Induprint SE375 | Anionic emulsion polymer based on styrene and acrylates | 17° C. | / | 45-47% as measured by DIN EN ISO 3251 |
| A | Makrovil V205 | Homopolymeric emulsion based on vinyl acetate, nonionic | 16° C. | / | 47-49% as measured by DIN EN ISO 3251 |
| B' | Z89 - silica | Silica Particles | / | Particle size D50, is 1.9 μm Particle size D97, is 9 μm acc. to ISO 13320: 2020 | |

15

Then, the contact angles of 1 µL droplets of ethylene glycol, diiodomethane, thiodiglycol drops were determined and using the Owens-Wendt-Rabel-Kaelble (OWRK) calculation method method (e.g. described in Owens et. Al., J. Appl. Polym. Sci. 13. (1969), 1741; Kaelble, J. Adhesion 2 (1970) 66) the dispersive, polar and total surface energy values were determined from the measured contact angles. The measurement was repeated on the paper itself without the coating. The DIN EN ISO 3251 norms used are the norms mentioned on the datasheet of the supplier and are suspected to be the norms of 2019.

16 cause a sufficient ink spreading, as can be determined from tests 4-6. Therefore, the surface energy components needed to be determined. Additionally, it could not be derived from the chemistry of the primer component whether it would constitute a A or B" component. For example, NeoCryl-BT-20 and Makrovil V 108 are both B" components, but have a different chemistry: an acrylic copolymer and a vinyl acetate polymer, respectively. However, for example Vinamul 3231 also constitutes a vinyl acetate polymer, but is an A component. It is thus not possible to tell from chemistry alone whether a component will constitute an A or B" component.

TABLE 2

Testing substrates with and without the individual primer components

| Test | Substrate | ID | Individual Primer Component | Contact Angle (degrees °) test ink WI-C2503 | Surface energy (mN/m) ** Total | Dispersive component | Polar component | Polar contribution % polar |
|------|-----------|-----|------------------|---------|--------|-------|-------|------|
| 1 | Rieger OC-D | | — | 16.3 * | 47.45 | 42.41 | 5.01 | 11% |
| 2 | MM X Liner HD | | — | 21 * | 37.75 | 34.44 | 4.31 | 11% |
| 3 | Metsaboard Pro WKL | | — | 23.2 * | 44.87 | 39.29 | 4.58 | 10% |
| 4 | Metsaboard Pro | A | Exopur 4109 | 20.8 * | 43.75 | 39.55 | 4.2 | 10% |
| 5 | WKL | B" | NeoCryl BT-20 | 9.5 ** | 36.41 | 26.95 | 9.46 | 26% |
| 6 | | A | NeoCryl D-2204 | 9.9 ** | 50.49 | 42.08 | 8.41 | 17% |
| 7 | | B" | Makrovil V108 | / | 44.98 | 35.25 | 9.73 | 22% |
| 8 | | A | Vinamul 3231 | / | 37.4 | 30.7 | 6.7 | 18% |
| 9 | | A | Baybond PU404 | / | 46.41 | 44.2 | 2.21 | 5% |
| 10 | | A | Neocryl XK-205 | / | 36.85 | 34.76 | 2.09 | 6% |
| 11 | | A | Eastek 1200 | / | 48.87 | 47.1 | 1.78 | 4% |
| 12 | | A | Daotan 7001 | / | 47.45 | 38.96 | 8.48 | 18% |
| 13 | | A | Neocryl A1120 | / | 21.58 | 21.49 | 0.08 | 0% |
| 14 | | A | Esacote P1 C1 | / | 40.36 | 37.12 | 3.25 | 8% |
| 15 | | A | Vinamul 3171 | / | 40.61 | 34.05 | 6.55 | 16% |
| 16 | | A | Induprint SE375 | / | 43.2 | 43.12 | 0.08 | 0% |
| 17 | | A | Makrovil V205 | / | 41.46 | 36.66 | 4.8 | 12% |

* for 1 µL droplet and 10 seconds equilibration time.
** for contact angles below 10 degrees the measurement technique becomes inaccurate due to an alomost full spreading of the droplet on the substrate and/or absorption of the test liquid in the paper bulk.

The contact angle values in Table 2 above indicate that ink spreading is the highest on Rieger OC-D (lowest contact angle), less on MM X Liner HD and the lowest on Metsaboard Pro WKL (highest contact angle). The spreading of the ink was determined on these substrates by measuring the contact angle of a 1 µL droplet after 10 seconds equilibration time. It has been found that due to the presence of the individual primer components formed as a dry primer film on the substrate that the wettability on said substrate can be increased. Indeed, as can be derived from the examples further herein, by having the combination of both component A and component B the one can set the surface of liners which are typically difficult to print on as desired, more in particular to set the surface as more receptive towards the ink, hence improving ink receptibility. Note that the test ink WI-C2503 is already optimized to achieve a very high level of spreading on coated paper substrates.

It was determined that based on the contact angle alone, it was not possible to determine whether a component would It is thus necessary to determine the polar contribution to the surface free energy to be able to determine whether it is an A or B" component.

Data regarding the particle size of each of the primer components was not always available. It is suspected by the inventors that characterization of this parameter is not essential for the invention.

Primer Components

Component B" having a polar contribution of more than 20%.

NeoCryl BT-20 is an anionic acrylic emulsion from DSM (Waalwijk, Netherlands) with high surface free energy for the polar component (9.46 mN/m) for the dried polymer layer, and classified as having a high wettability increasing polymer. Table 2 demonstrates a high polar contribution (26%) to the surface energy for NeoCryl BT-20 which makes it very suitable for a waterbased ink to spread out easily on the substrate. This compatibility between waterbased ink and substrate is confirmed by the contact angle measurement with test ink WI-C2503.

Makrovil V108 is a homopolymeric emulsion from Indulor (Ankum, Germany) with a high surface free energy for the polar component (9.73 mN/m) for the dried polymer layer, and classified as having a high wettability increasing polymer. Table 2 demonstrates a high polar contribution (22%) to the surface energy for Makrovil V108 which makes it very suitable for a waterbased ink to spread out easily on the substrate.

Component A having a polar contribution of less than 20%.

NeoCryl D-2204 is an anionic acrylic dispersion from DSM and is classified as a medium wettable polymer. For the test ink WI-C2503 the polar contribution (17%) of NeoCryl D-2204 is still sufficient for the 1 µL ink droplet to spread out, although it is already significantly lower than the % polar contribution of Neocryl BT-20. As such, it can be considered as a medium wettable polymer.

Exopur 4109 is an anionic acrylic emulsion having an acrylic copolymer, from EOC (Oudenaarde, Belgium) and is classified as a low polar polymer. The properties of Exopur 4109 however seem to closely mimic those of the reference substrate, therefore the difference in contact angle of the test ink droplet between substrate and polymer film on the substrate is in that case minimal. As such, Exopur 4109 is classified as a low polar polymer.

Vinamul 3231 is a vinyl acetate and ethylene copolymer emulsion with limited ionicity, from Celanese (Irving, Texas, US). The polar contribution of 18% is significant but for the experiments it is determined the Vinamul 3231 is classified as a low polar polymer and still needs to combined with other primer ingredients to achieve sufficient wetting of ink.

Baybond PU404 is non-ionic polyester urethane polymer obtained from Covestro Coating Resins (Waalwijk, The Netherlands). The polar contribution of 2.21% is very low and this ideally suitable to limit excessive spreading of ink over the substrate.

Neocryl XK-205 is an anionic acrylic styrene copolymer emulsion obtained from Covestro Coating Resins (Waalwijk, The Netherlands).

Eastek 1200 is an aqueous dispersion of a polyester polymer obtained from Eastman (Kingsport, Tennessee, US).

Daotan 7001 is an anionic polyurethane dispersion with polyester backbone from Allnex (Frankfurt am Main, Germany). Based on the high polar surface energy (8.48 mN/m) and medium polar contribution value (18%) this polymer was tested whether it could substitute B", but finally found to provide insufficient wetting of ink on the substrate. Additionally, this polymer did not have a positive effect on other image quality properties such as ink intercolor bleeding. It was thus determined based on the measurements of Daotan 7001 that a lower boundary of the polar contribution of the surface energy needs to be above 18%.

Neocryl A1120 is a modified acrylic-styrene copolymer dispersion Covestro Coating Resins (Waalwijk, The Netherlands).

Esacote P1 C1 is a cation polyurethane dispersion from Lamberti (Gallarate, Italy).

Vinamul 3171 is a non-ionic vinyl acetate ethylene copolymer from Celanese (Irving, Texas, US). Due to its medium polar surface energy value (6.55 mN/m) and polar contribution (16%) this polymer was found to give good image quality results when printing with digital inks on substrates primered with this polymer but only in combination with other polymers giving even better wetting properties.

Induprint SE375 is an anionic emulsion polymer based on styrene and acrylates from Indulor (Ankum, Germany).

Makrovil V205 is a nonionic homopolymeric emulsion based on vinyl acetate from Indulor (Ankum, Germany).

Any of the polymeric binder components that have a polar contribution below 20% (component A) were found to be unsuitable to sufficiently promote wetting of ink on the substrate on its own and thus requires a combination with a primer component that has a polar contribution of 20% or more (B").

2. Evaluation of Examples.

Evaluation of Ink Spreading

Features of having the primer layer shall now be evaluated, in particular the evaluation of image quality and the evaluation of bleeding. An evaluation of the image quality has been made, in particular the ink spreading for avoiding insufficient dotgain and the resulting white stripes. With a 600 dpi Kyocera KJ4B at a speed of 1 m/sec a 100% 3 pxl cyan line was printed on two types of substrates: substrate type 1: a substrate with a primer layer as described herein; substrate type 2: a substrate without a primer layer (blanco) or a substrate with a badly designed primer layer. After applying the primers on the paper substrate it was left to dry for at least 5 minutes at ambient room conditions before printing. Directly after the cyan lines where printed infrared drying was used to ensure drying of the ink layer and remove most of the liquids in the ink layer. The infrared drying station, placed after every color printing unit, is equipped with 4×1330 W lamps (1.3 µm wavelength) each emitting 52 W/cm.

For the dried print the width of the 3 pxl cyan line was measured with a PIAS™-II Personal Image Analysis System (Quality Engineering Associates). The following abbreviations were used for the evaluation:

| | |
|---|---|
| A. >150 µm: | excellent ink spreading, no stripes |
| B. 125 µm-150 nm: | improved ink spreading, acceptable level of stripes |
| C. <125 µm: | non-acceptable ink spreading, high level of stripes |

Evaluation of Bleeding

First a monolayer yellow 100% 18 pL was printed on the substrate with a 600 dpi Kyocera KJ4B at a speed of 1 m/sec and consecutively a 100% 3 pxl 18 pL cyan line was printed over the yellow monolayer patch. Since both color printing units were used, the infrared drying units after each of the two color printing units were activated during printing, to ensure (partial) removal of the liquid in the ink layer. This means that infrared drying occurred after printing the yellow monolayer and a second infrared drying occurred after printing the cyan pattern. For the dried print the width of the 3 pxl cyan line was measured with a PIAS™-II Personal Image Analysis System (Quality Engineering Associates). The following abbreviations were used for the evaluation:

| | |
|---|---|
| A. <125 µm: | very good, no to almost no visible bleeding |
| B. 125-150 µm: | acceptable |
| C. >150 µm: | not acceptable |

3. Examples of Primer Formulations.

Test Inks

Water based inks C (WI-C2503) and Y (WI-Y2502) were prepared by mixing the ingredients as mentioned in Table 3 below for 30 minutes. The amounts in Table 3 are weight % of the total weight of the water based ink. The amount of water is added to add up to 100 weight % in total. Afterwards the inks were filtered over a 1 µm filter. The viscosity of the inks is about 6 mPa·s, which is within the specification of the Kyocera KJ4BYH 600 dpi and Fuji Samba G3L 1200 dpi head.

TABLE 3

| Ingredients and amounts for the water based inks. | | WI-C2503* [wt %] | WI-Y2502 [wt %] |
| --- | --- | --- | --- |
| Water based ink ingredients | | | |
| Ingredient | Description | PB15:3 | PY74 |
| Pigment dispersion APD1000 | Polymer encapsulated pigment dispersion, Fuji (15 wt % pigment concentration in water) | 21 | 21 |
| Glycerol | | 17 | 17 |
| Propane diol | | 8 | 8 |
| Diethyleneglycol monobutylether | DEG - monobutylether | 3 | 3 |
| Lubrijet T340 | Acrylic binder (33.5 wt % solids in water), Lubrizol UK | 9 | 9 |
| Surfynol 440 | Polyether modified acetylenediol, Evonik | 1 | 1 |
| Surfynol 465 | Polyether modified acetylenediol, Evonik | 1 | 1 |
| Byk 347 | Polyether modified siloxane surfactant, Byk | 0.75 | 0.75 |
| Tegowet 280 | Polyether modified siloxane surfactant, Evonik | 0.75 | 0.75 |
| Water | | rest | rest |

*test ink used in Table 2

Substrates

During the experiments, different types of substrates where tested of which some are shown in Table 4 below.

TABLE 4

| Substrate types | | | |
| --- | --- | --- | --- |
| Type of substrate | Producer | Name | Spreading of water based ink |
| 1 coated white kraft liner | Metsaboard | Pro WKL | Lowest |
| 2 coated test liner (recycled) | Hamburger | Rieger OC-D | Highest |
| 3 coated test liner (recycled) | Mayr-Melnhof | XL HD | Medium |

Primer Formulations Applied on Substrate

Further, different formulas for the primer were prepared having the individual primer components present in different amounts.

TABLE 5

Primer formulations
Primer formulas applied on the substrate layer to form a dry primer film

| | | | Indication: | | | | | | | | | |
| --- | --- | --- | --- | --- | --- | --- | --- | --- | --- | --- | --- | --- |
| | | | Ex. 1 | Ex. 2 | Ex. 3 | Ex. 4 | Ex. 5 | Ex. 9 | Ex. 10 | Comp. 6 | Comp. 7 | Comp. 8 |
| | | | Amount (*): | | | | | | | | | |
| | Ingredients | Solids (%)(**) | Wet-Wt % | Wet-Wt % | Wet-Wt % | Wet-Wt % | Wet-Wt % | Wet-Wt % | Wet-Wt % | Wet-Wt % | Wet-Wt % | Wet-Wt % |
| | | | Components A | | | | | | | | | |
| A | Exopur 4109 | 40 | — | — | 15 | 15 | 7.5 | — | — | — | — | 30 |
| A | NeoCryl D-2204 | 40 | 33.75 | 33.75 | — | — | — | — | — | 33.75 | — | — |
| A | Vinamul 3231 | 50 | — | — | — | — | — | — | 10 | | | |
| A | Baybond PU 404 | 50 | — | — | — | — | — | 3 | — | — | — | — |
| | | | Components B | | | | | | | | | |
| B" | NeoCryl BT-20 | 40 | — | — | 15 | 15 | 22.5 | — | — | — | 30 | — |

TABLE 5-continued

| | | Primer formulations Primer formulas applied on the substrate layer to form a dry primer film | | | | | | | | | |
|---|---|---|---|---|---|---|---|---|---|---|---|
| | | Indication: | | | | | | | | | |
| | | Ex. 1 | Ex. 2 | Ex. 3 | Ex. 4 | Ex. 5 | Ex. 9 | Ex. 10 | Comp. 6 | Comp. 7 | Comp. 8 |
| | | Amount (*): | | | | | | | | | |
| Ingredients | Solids (%)(**) | Wet-Wt % | Wet-Wt % | Wet-Wt % | Wet-Wt % | Wet-Wt % | Wet-Wt % | Wet-Wt % | Wet-Wt % | Wet-Wt % | Wet-Wt % |
| B" Makrovil V 108 | 50 | — | — | — | — | — | 20 | 10 | — | — | — |
| B' Z89 - silica | 100 | 3 | 5 | — | 3 | 3 | 4 | 4 | — | — | — |
| Water | | rest | rest | rest | rest | rest | rest | rest | rest | rest | rest |
| Total Solid Content (**) | | 16.5 | 18.5 | 12 | 15 | 15 | 15.5 | 14 | 13.5 | 12 | 12 |

(*) The amount is the wet weight percentage, expressed as the wet weight of the respective component over the total wet weight of the primer formula.
(**) The solids (%) is the mass of the solids divided by the total (wet) mass of therespective components.

The primer formulations above can be used to improve a surface of a liner, more in particular to improve the ink compatibility characteristics, such as a desired level of ink spreading and dotgain.

Primer Kits to Make the Formulations Shove

In the case that the primer examples as shown in Table 5 are to be formulated starting with a primer kit consisting of two (or more) primers, such as PK1 with a first primer 1-P1 and a second primer 1-P2. Such primers may for example be given in bottles having the following type/amount of components:

In Kit-A, it can be seen that the primer P1 comprises the combination of A and B', namely 33.75 wet-wt % of Neocryl D-2204 and inorganic particle Z89. In kit-B, kit-D and kit-E, it can be seen that the primer P1 comprises the combination of A and B", e.g. 30 wet-wt % of NeoCryl D-2204 and 30 wet-wt % NeoCryl BT-20 in kit-B. In kit-C, it can be seen that primer P1 comprises the combination of A and B', namely 30 wet-wt % of Exopur 4109 and 3 wet-wt % of inorganic particle Z89. As such, it can be seen that there is always one primer in the primer kit having a combination of

TABLE 6

| | | Primer kit examples | | | | | | | | | |
|---|---|---|---|---|---|---|---|---|---|---|---|
| | | KIT | | | | | | | | | |
| | | Kit A:PK1 | | Kit B:PK2 | | Kit C:PK3 | | Kit D:PK4 | | Kit E:PK5 | |
| | | Primers present in the kit: | | | | | | | | | |
| | Components | 1-P2 Wet-Wt % | 1-P1 Wet-Wt % | 2-P1 Wet-Wt % | 2-P2 Wet-Wt | 3-P1 Wet-Wt % | 3-P2 Wet-Wt % | 4-P1 Wet-Wt % | 4-P2 Wet-Wt % | 5-P1 Wet-Wt % | 5-P2 Wet-Wt % |
| A | NeoCryl D-2204 | 33.75 | 33.75 | 0 | 0 | 0 | 0 | 0 | 0 | 0 | 0 |
| A | Exopur 4109 | 0 | 0 | 30 | 0 | 30 | 0 | 0 | 0 | 0 | 0 |
| A | Vinamul 3231 | 0 | 0 | 0 | 0 | 0 | 0 | 0 | 0 | 20 | 0 |
| A | Baybond PU 404 | 0 | 0 | 0 | | 0 | | 6 | 0 | 0 | 0 |
| B" | NeoCryl BT-20 (high polar contribution) | 0 | 0 | 30 | 0 | 0 | 30 | 0 | 0 | 0 | 0 |
| B" | Makrovil V 108 | 0 | 0 | 0 | 0 | 0 | 0 | 40 | 0 | 20 | 0 |
| B' | Z89 (silica, Hoffmann Minerals) | 0 | 10 | 0 | 60 | 3 | 3 | 0 | 8 | 0 | 8 |
| | Water | rest | rest | rest | rest | rest | rest | rest | rest | rest | Rest |
| | primer composition | A | A and B' | A and B" | B' | A and B' | B" and B' | A and B" | B' | A and B" | B' |

23

A and B, by having said combination, one can achieve a decent ink receptibility of the primer layer formed with the primer of the primer kit.

Making a Printing Primer Starting with the Primer Kit

Indeed, by selecting the right primers of the primer kit in a suitable amount to form a printing primer to apply a primer layer on the substrate, one can adjust the surface characteristic of the substrate by forming a well-designed primer layer thereon. In this way one may improve ink receptibility and print quality. More in particular one can achieve a desired ink spreading and intercolor bleeding (preferably no bleeding). Indeed, by having the different types of primers at the disposal in the primer kit, and when a different type of substrate is used, one can adapt and set the ink receptibility of said substrate as desired by mixing the primers of the primer kit and applying the mixture as a printing primer on the substrate in order to adjust the substrate's ink receptibility and achieve a decent print quality. For example the following mixing ratios of the Primer Kit examples of Table 6 were used to form the formulations shown in examples 1-5 in Table 5.

TABLE 7

Primer kit mixing ratio examples

| | Primer Kit Mix Ratio | | | | | | | | | | |
|---|---|---|---|---|---|---|---|---|---|---|---|
| Printing Primer formula: | 1-P2 | 1-P1 | 2-P1 | 2-P2 | 3-P1 | 3-P2 | 4-P1 | 4-P2 | 5-P1 | 5-P2 | water |
| Primer Ex. 1 | 2.33 | 1 | — | — | — | — | — | — | — | — | — |
| Primer Ex. 2 | 1 | 1 | — | — | — | — | — | — | — | — | — |
| Primer Ex. 3 | — | — | 1 | — | — | — | — | — | — | — | 1 |
| Primer Ex. 4 | — | — | — | — | 1 | 1 | — | — | — | — | — |
| Primer Ex. 4' | — | — | 10 | 1 | — | — | — | — | — | — | 9 |
| Primer Ex. 5 | — | — | — | — | 1 | 3 | — | — | — | — | — |
| Primer Ex. 6 | — | — | — | — | — | — | 1 | 1 | — | — | — |
| Primer Ex. 7 | — | — | — | — | — | — | 4 | 1 | — | — | 3 |
| Primer Ex. 8 | — | — | — | — | — | — | — | — | 1 | 1 | — |
| Primer Ex. 9 | — | — | — | — | — | — | — | — | 4 | 1 | 3 |

Different types of coated substrates that differ in wettability and/or types of inks may require a different primer approach. By having the primer kit with said first primer P1 and second primer P2, one may adjust the amounts of P1 and P2 to make the third printing primer P3 to obtain a sufficient image quality on all three liners of Table 4. E.g. if one has primer kit A having a first primer 1-P1 and a second primer 1-P2, one is able to produce a printing primer and form a primer layer with high amounts of primer 1-P1 and lower amounts of 1-P2 (e.g. making primer example 1) for substrates that do not need a high boost in ink wettability due to the fact that bottle 1-P2 has a solution with a high amount of silica. When the substrate is less wettable it may be beneficial for the image quality to use a higher amount of bottle 1-P2 versus the amount of bottle 1-P1 (e.g. making primer example 2). The mixing ratios of 2-P1; 2-P2 and 3-P1 and 3-P2 should be chosen similarly when making the formulation to form the primer layer on the substrate, depending on how much of component B is needed based on the surface characteristics of the substrate. It is possible to make the same primer using different kits by choosing the appropriate mixing ratios: primer ex. 4 and 4' are identical, but are made by mixing 3-P1 and 3-P2, or 2-P1 and 2-P2 respectively in appropriate mixing ratios.

24

4. Results of Ink on the Printing Primer

TABLE 8

Results and evaluation

| ex | Substrate | Primer | Ink spreading | Intercolor bleeding | ex/com |
|---|---|---|---|---|---|
| ex 1 | Metsaboard Pro | blanco | C | C | com |
| ex 2 | Rieger OC-D | blanco | C | C | com |
| ex 3 | MM XL HD | blanco | C | C | com |
| ex 4 | Metsaboard Pro | 6 μm primer 6 | C | B | com |
| ex 5 | Metsaboard Pro | 6 μm primer 7 | A | C | com |
| ex 6 | Metsaboard Pro | 6 μm primer 8 | C | C | com |
| ex 7 | Metsaboard Pro | 6 μm primer 2 | A | B | ex |
| ex 8 | MM XL HD | 6 μm primer 2 | A | B | ex |
| ex 9 | Rieger OC-D | 6 μm primer 2 | A | A | ex |
| ex 10 | Rieger OC-D | 6 μm primer 1 | A | A | ex |
| ex 11 | Metsaboard Pro | 6 μm primer 5 | A | A | ex |
| ex 12 | Rieger OC-D | 6 μm primer 4 | A | B | ex |
| ex 13 | Rieger OC-D | 6 μm primer 3 | B | B | ex |
| ex 14 | MM XL HD | 6 μm primer 5 | A | B | ex |
| ex 15 | MM XL HD | 6 μm primer 4 | B | B | ex |

TABLE 8-continued

Results and evaluation

| ex | Substrate | Primer | Ink spreading | Intercolor bleeding | ex/com |
|---|---|---|---|---|---|
| ex 16 | Metsaboard Pro | 6 μm primer 9 | B | A | ex |
| ex 17 | MM XL HD | 6 μm primer 9 | A | A | ex |
| ex 18 | Metsaboard Pro | 6 μm primer 10 | B | A | ex |
| ex 19 | MM XL HD | 6 μm primer 10 | A | B | ex |

From comparative 1 to 6, one learns that print samples without a primer according to the invention, e.g. either without a primer or with a primer with only part A or part B, have a score for a wettability or a intercolor bleeding or both that is not acceptable.

From examples 7 to 10, one learns that with primer kit 1, using component A and B', one can use different mixing ratios of P1 and P2 (primer 1 and primer 2) to adjust for the wettability of the substrate without reaching a non-acceptable intercolor bleeding level. I.e. for the most wettable substrate (e.g Rieger, ex 10) primer 1 is already sufficient to obtain acceptable results where for the same results on the low wettable substrate (e.g Metsaboard, ex 7) primer 2 with more component B', is more suitable and advised.

From examples 11 to 19, one learns that in those examples, different components A+B' and/or B" are used. The same effect is seen in examples 12 and 13 as for ex 7-10:

i.e. by changing the mixing ratio of P1 and P2 of primer kit 2 (primer 3 and 4) and thus varying the ratio of A vs. B" one can adjust for the wettability of the board.

With primer 3 already an acceptable wettability and intercolor bleeding can be obtained on the most wettable substrate (Rieger OCD), but by using primer 4 one can achieve further improved image quality. Also on substrates such as MM XL HD and Metsaboard Pro it may be beneficial to use further a combination of A+B'+B" since the best possible print quality is achieved with primer 5 (see examples Nov. 14, 2015). Note that primer 4 and 5 can be made with primer kit 3.

From the table above, it can be seen that improved print results are achieved with a primer formula having both component A and B over the print results on the substrates without a primer layer formed thereon. In practice, it is favored to adjust the mixing ratios based on a printed test image.

Based on the description above, a person skilled in the art understands that the aspects of the invention can be carried out in various ways and based on various principles. In doing so, the invention is not limited to the forms of execution and/or examples as described above as they are merely illustrative and serve only to increase the understanding of the aspects of the invention. Accordingly, the aspects are limited to the implementation forms as described herein, but are defined in the claims.

The invention claimed is:

1. A primer composition for forming a primer layer, on a substrate to be printed on with an ink, wherein the composition comprises:
   a first polymeric binder component A having a first polar contribution pc1 less than 20%;
   a second component B comprising a second polymeric binder component B" and optionally an inorganic particle B'; wherein said polymeric binder component B" has a second polar contribution pc2 equal or higher than 20%;
   wherein the amounts of A, B' and/or B", based on the dry weight of the composition, are as such that when present B'/(A+B"+B') is smaller than 15%; and
   wherein said first polar contribution pc1 and second polar contribution pc2 are determined by the following method:
   applying a 6 gsm dry layer of components A or B", respectively;
   applying a 1 µL droplet of ethylene glycol on the dry layer and measuring the contact angle CA1 after 10 seconds equilibrium time;
   applying a 1 µL droplet of diiodomethane on the dry layer and measuring the contact angle CA2 after 10 seconds equilibrium time;
   applying a 1 µL droplet of thiodiglycol on the dry layer and measuring the contact angle CA3 after 10 seconds equilibrium time;
   calculating the polar surface free energy, dispersive surface free energy and total surface free energy, wherein the total surface free energy is the sum of the polar surface free energy and the dispersive surface free energy, wherein the calculation is performed using the Owens-Wendt-Rabel-Kaelble method using contact angles CA1, CA2 and CA3 as input values; and wherein the first polar contribution pc1 and second polar contribution pc2 are the ratio of the polar surface free energy over the total surface free energy value as determined for components A respectively B", expressed as a percentage.

2. The primer composition according to claim 1, wherein the second polar contribution pc2 of the second component B, is more than 22%.

3. The primer composition according to claim 1, wherein the dry weight ratio of A/(B' and/or B") is between 0.05 and 20.

4. The primer composition according to claim 1, wherein the combined solid content of component A, inorganic particle B' and/or component B" are at least 12% of the wet weight of the primer composition.

5. The primer composition according to claim 1, wherein component A and B are anionic or non-ionic.

6. The primer composition according to claim 1, wherein the composition comprises less than 0.05 wt % flocculant agents, based on the total weight of the primer composition.

7. The primer composition according to claim 1, wherein component A has an MFFT value of less 80° C.

8. The primer composition according to claim 1, wherein the average particle size of the inorganic particle is more than 0.3 µm as measured according to ISO 13320:2020.

9. The primer composition according to claim 1, wherein the second polymeric binder component B" has a polar part of the surface free energy of component B" that is 9 mN/m or more.

10. The primer composition according to claim 1, wherein the second polymeric binder component B" is present as a water based emulsion.

11. A substrate with a primer layer, formed thereon, wherein said primer layer comprises the primer composition of claim 1; and wherein said primer layer has a dry primer layer thickness below 3 gsm.

12. A method of printing with an ink on a substrate, wherein said method comprises the steps of:
   providing the substrate;
   creating a primer layer PL on the substrate by applying the primer composition according to claim 1; and
   applying the ink on the substantially dry primer layer.

13. The method according to claim 12, further comprising one or more of the following:
   wherein the primer composition is applied with a piezo inkjet nozzle;
   wherein the substrate is a polymeric film or a coated paper substrate;
   wherein the primer composition is applied in a functional amount of less than 16 gsm wet weight thickness;
   wherein the substrate is provided at a single pass speed of more than 20 m/min;
   wherein the primer composition is applied such that the wet weight thickness thereof is between 0.5 gsm and 8 gsm.

14. A primer kit to adjust a surface of a substrate with a printing primer (P3), wherein said primer kit comprises:
   a first primer P1 comprising:
      a first polymeric component A1 having a first polar contribution pc1 of less than 20%;
      and a second component B1 comprising:
         an inorganic particle B1' and/or a second polymeric binder component B1"; wherein said polymeric binder component B1" has a second polar contribution pc2 equal or higher than 20%;

27 a second primer P2 comprising:

a third polymeric component A2 having a third polar contribution pc3 of less than 20%;

and/or a fourth component B2, selected from one or more of: an inorganic particle B2', and a fourth polymeric binder component B2" having a fourth polar contribution pc4 equal or higher than 20%, wherein the first primer P1 is different from the second primer P2, such that the wt %-ratio of (A1+A2)/(B1+B2) in the printing primer P3 can be adjusted by mixing a first amount of first primer and a second amount of second primer, in order to adjust the surface of the substrate as desired by applying the printing primer P3 thus obtained thereon, wherein said first, second, third, and fourth polar contributions pc1, pc2, pc3, pc4 are determined by the following method:

applying a 6 gsm dry layer of the respective components, respectively;

applying a 1 μL droplet of ethylene glycol on the dry layer and measuring the contact angle CA1 after 10 seconds equilibrium time;

applying a 1 μL droplet of diiodomethane on the dry layer and measuring the contact angle CA2 after 10 seconds equilibrium time;

applying a 1 μL droplet of thiodiglycol on the dry layer and measuring the contact angle CA3 after 10 seconds equilibrium time;

calculating the polar surface free energy, dispersive surface free energy and total surface free energy, wherein the total surface free energy is the sum of the polar surface free energy and the dispersive surface free energy, wherein the calculation is performed using the Owens-Wendt-Rabel-Kaelble method using contact angles CA1, CA2 and CA3 as input values; and wherein the polar contribution is the ratio of the polar surface free energy over the total surface free energy value as determined for the respective components, expressed as a percentage.

15. The primer kit according to claim 14, wherein the first polymeric component A1 and the third polymeric component A2 can be different or the same.

16. The primer kit according to claim 14, wherein the second polymeric component B1 and the fourth polymeric component B2 can be different or the same.

17. The primer kit according to claim 14, wherein either the first polymeric component A1 is different from the third polymeric component A2, or the second polymeric component B1 is different from the fourth polymeric component B2.

18. A set of the primer kit according to claim 14 to obtain a printing primer P3 for adjusting ink receptibility of a substrate by applying said printing primer P3 thereon, wherein said set further comprises one or more inkjet inks.

19. A method to obtain a printing primer P3 for adjusting ink receptibility of a substrate by applying said printing primer P3 thereon, said method comprising:

providing a first primer P1 comprising:

a first polymeric component A1 having a first polar contribution pc1 of less than 20%;

and/or a second component B1 comprising:

an inorganic particle B1' and/or a second polymeric binder component B1"; wherein said polymeric binder component B1" has a second polar contribution pc2 equal or higher than 20%;

28 providing a second primer P2 comprising:

a third polymeric component A2 having a third polar contribution pc3 of less than 20%;

and/or a fourth component B2 comprising:

an inorganic particle B2' and/or a fourth polymeric binder component B2"; wherein said fourth polymeric binder component B2" has a fourth polar contribution pc4 equal or higher than 20%;

with the proviso that at least one of the primers P1, P2 includes a polymeric component having a polar contribution of less than 20% and that the other one of the primers P1, P2 include a component selected from one or more of: an inorganic particle, a polymeric component having a polar contribution of more than 20%;

mixing a first amount p1 of the first primer P1 and a second amount p2 of the second primer P2 to form the printing primer P3;

applying the printing primer P3 on a surface of the substrate;

testing the ink receptibility by printing a test image; and if required adjust the first amount p1 and/or the second amount p2 to set wt %-ratio of (A1+A2)/(B1+B2) in the printing primer P3 based a characteristic of the printed test image, wherein said first, second, third, and fourth polar contributions pc1, pc2, pc3, pc4 are determined by the following method:

applying a 6 gsm dry layer of the respective components, respectively;

applying a 1 μL droplet of ethylene glycol on the dry layer and measuring the contact angle CA1 after 10 seconds equilibrium time;

applying a 1 μL droplet of diiodomethane on the dry layer and measuring the contact angle CA2 after 10 seconds equilibrium time;

applying a 1 μL droplet of thiodiglycol on the dry layer and measuring the contact angle CA3 after 10 seconds equilibrium time;

calculating the polar surface free energy, dispersive surface free energy and total surface free energy, wherein the total surface free energy is the sum of the polar surface free energy and the dispersive surface free energy, wherein the calculation is performed using the Owens-Wendt-Rabel-Kaelble method using contact angle's CA1, CA2 and CA3 as input values; and wherein the polar contribution is the ratio of the polar surface free energy over the total surface free energy value as determined for the respective components, expressed as a percentage.

20. The printing primer P3 obtained by the method according to claim 19.

21. A substrate with a primer layer, formed thereon, wherein said primer layer comprises printing primer P3 as defined in claim 20; and wherein said primer layer has a dry primer layer thickness below 3 gsm.

22. A method of printing with an ink on a substrate, wherein said method comprises the steps of:

providing the substrate;

creating a primer layer PL on the substrate by applying printing primer P3 obtained by the method according to claim 19; and applying the ink on the substantially dry primer layer.

* * * * *